US011804590B2

(12) United States Patent
Liu et al.

(10) Patent No.: US 11,804,590 B2
(45) Date of Patent: Oct. 31, 2023

(54) SECONDARY BATTERY, PREPARATION METHOD THEREOF, AND BATTERY MODULE, BATTERY PACK, AND APPARATUS CONTAINING SECONDARY BATTERY

(71) Applicant: CONTEMPORARY AMPEREX TECHNOLOGY CO., LIMITED, Ningde (CN)

(72) Inventors: Qian Liu, Ningde (CN); Quanguo Li, Ningde (CN); Xia Hu, Ningde (CN); Yonghuang Ye, Ningde (CN); Wei Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 34 days.

(21) Appl. No.: 18/046,157

(22) Filed: Oct. 13, 2022

(65) Prior Publication Data
US 2023/0075325 A1 Mar. 9, 2023

Related U.S. Application Data

(63) Continuation of application No. PCT/CN2020/109120, filed on Aug. 14, 2020.

(51) Int. Cl.
*H01M 4/36* (2006.01)
*H01M 4/04* (2006.01)
*H01M 4/131* (2010.01)
*H01M 4/136* (2010.01)
*H01M 4/1391* (2010.01)
*H01M 4/1397* (2010.01)
*H01M 4/525* (2010.01)
*H01M 4/58* (2010.01)
*H01M 10/0525* (2010.01)
*H01M 10/058* (2010.01)
*H01M 4/02* (2006.01)

(52) U.S. Cl.
CPC ......... *H01M 4/364* (2013.01); *H01M 4/0404* (2013.01); *H01M 4/131* (2013.01); *H01M 4/136* (2013.01); *H01M 4/1391* (2013.01); *H01M 4/1397* (2013.01); *H01M 4/525* (2013.01); *H01M 4/5825* (2013.01); *H01M 10/058* (2013.01); *H01M 10/0525* (2013.01); *H01M 2004/021* (2013.01); *H01M 2004/028* (2013.01); *H01M 2220/20* (2013.01)

(58) Field of Classification Search
None
See application file for complete search history.

(56) References Cited

U.S. PATENT DOCUMENTS

2002/0031703 A1* 3/2002 Kameyama ......... H01M 50/121
429/324
2012/0052299 A1 3/2012 Fan et al.

FOREIGN PATENT DOCUMENTS

| CN | 102790202 B | 4/2017 |
| CN | 106716688 A | 5/2017 |
| CN | 107046131 A | 8/2017 |
| CN | 109119619 A | 1/2019 |
| CN | 109461912 A | 3/2019 |
| CN | 111446488 A | 7/2020 |
| EP | 3859824 A1 | 8/2021 |
| JP | 5672113 B2 | 2/2015 |
| JP | 2016058214 A | 4/2016 |
| JP | 2019061826 A | 4/2019 |
| WO | 2016163282 A1 | 10/2016 |

OTHER PUBLICATIONS

E. Allahyari, M. Ghorbanzadeh, R. Riahifar, S. M. M. Hadavi. Electrochemical performance of NCM/LFP/AI composite cathode materials for lithium-ion batteries, Mater. Res. Express 5 (2018) 055503.*
J.B. Dunn, C. James, L. Gaines, K. Gallagher, Q. Dai, J. Kelly. Materials and Energy Flows in the Production of Cathode and Anode Materials for Lithium Ion Batteries, Argonne National Laboratory, Energy Systems Division, Sep. 2015.*
International Search Report and Written Opinion received in PCT Application PCT/CN2020/109120 dated Apr. 27, 2021.
GB 38031-2020, "Electric vehicles traction battery safety requirements".
GB/T 24586-2009, "Iron ores—Determination of apparent density, true density and porosity".
GB/T 19077-2016/ISO 13320:2009, "Particle size analysis—Laser diffraction methods".
GB/T 31484-2015, "Cycle life requirements and test methods for traction battery of electric vehicle".
GB/T 31485-2015, "Safety requirements and test methods for traction battery of electric vehicle".
GB/T 31486-2015, "Electrical performance requirements and test methods for traction battery of electric vehicle".

(Continued)

*Primary Examiner* — Carlos Barcena
(74) *Attorney, Agent, or Firm* — Kilpatrick Townsend & Stockton LLP

(57) ABSTRACT

A secondary battery and a preparation method thereof, and a battery module, battery pack, and apparatus containing a secondary battery are provided. In some embodiments, the secondary battery includes a positive electrode plate, a negative electrode plate, and an electrolyte, where the positive electrode plate includes a positive electrode current collector and a positive electrode film layer that is disposed on at least one surface of the positive electrode current collector and that includes a positive electrode active material, and the negative electrode plate includes a negative electrode current collector and a negative electrode film layer that is disposed on at least one surface of the negative electrode current collector and that includes a negative electrode active material; and the positive electrode active material includes a first material and a second material.

14 Claims, 2 Drawing Sheets

(56) References Cited

OTHER PUBLICATIONS

GB/T19596-2004, "Terminology of electric vehicles".
JY/T 010-1996, "General rules for analytical scanning electron microscopy".
The first Office Action received in the corresponding CN Application 202080081119.X, dated Oct. 24, 2022.
The second Office Action received in the corresponding CN Application 202080081119.X, dated Jan. 28, 2023.
The Extended European Search Report received in the corresponding European Application 20949122.4, dated May 10, 2023.
Anonymous: "Characterization method of compaction density of cathode and anode electrode materials for lithium b", Jul. 6, 2020 (Jul. 5, 2020), XP093042932, Retrieved from the Internet: URL:https://www.iesttech.com/en/NewsDetail2254816.html [retrieved on Apr. 28, 2023].
Anonymous: "Transition metal—Wikipedia" , Jan. 1, 2000 (Jan. 1, 2000), XP093032392, Retrieved from the Internet: URL:https://en.wikipedia.org/wiki/Transition_metal [retrieved on Mar. 16, 2023].

\* cited by examiner

SECONDARY BATTERY, PREPARATION METHOD THEREOF, AND BATTERY MODULE, BATTERY PACK, AND APPARATUS CONTAINING SECONDARY BATTERY

CROSS-REFERENCE TO RELATED APPLICATIONS

This application is a continuation of International Application PCT/CN2020/109120, filed Aug. 14, 2020 and entitled "SECONDARY BATTERY, PREPARATION METHOD THEREOF, AND BATTERY MODULE, BATTERY PACK, AND APPARATUS CONTAINING SECONDARY BATTERY", which is incorporated herein by reference in its entirety.

TECHNICAL FIELD

This disclosure relates to the technical field of energy storage apparatuses, and specifically, to a secondary battery and a preparation method thereof, and a battery module, battery pack, and apparatus containing a secondary battery.

BACKGROUND

Secondary batteries are widely applied due to their outstanding characteristics such as light weight, high energy density, zero pollution, zero memory effect, and long service life.

In recent years, environmental issues have drawn increasing attention, and this in turn has promoted development of new energy vehicles, which further increases demands for the secondary batteries. In addition, consumers and automobile manufacturers propose higher requirements for endurance mileage of automobiles, requiring higher energy density of secondary batteries serving as power sources. Therefore, in order to improve market competitiveness of new energy vehicles, it is definitely necessary to provide a new technology to endow the secondary batteries with higher energy density.

SUMMARY

The inventors have found that, to increase energy density of a secondary battery, current improvements focus use of active materials with a high gram capacity, for example, a positive electrode active material with a high gram capacity such as lithium nickel cobalt manganese oxide. However, such material has poor structural stability during charging and discharging, which causes rapid capacity drop of the secondary battery during long-term use, affecting long-term cycling performance of the secondary battery. How to improve the energy density of the secondary battery while ensuring better cycling performance has become a technical problem that urgently needs to be resolved in the development of secondary batteries.

To resolve the foregoing technical problem, a first aspect of this disclosure provides a secondary battery, including a positive electrode plate, a negative electrode plate, and an electrolyte, where the positive electrode plate includes a positive electrode current collector and a positive electrode film layer that is disposed on at least one surface of the positive electrode current collector and that includes a positive electrode active material, and the negative electrode plate includes a negative electrode current collector and a negative electrode film layer that is disposed on at least one surface of the negative electrode current collector and that includes a negative electrode active material;

the positive electrode active material includes a first material and a second material, the first material contains one or more of layered lithium transition metal oxides and their modified compounds, and the second material contains one or more of an olivine-structured lithium-containing phosphate and its modified compounds; and the secondary battery satisfies $$4 \le \frac{d_c \times l_c \times d_a \times l_a}{I_e} \le 90,$$

where $d_c$ is compacted density of the positive electrode film layer and measured in $g/cm^3$;

$l_c$ is a mass ratio of the positive electrode active material to the positive electrode film layer;

$d_a$ is compacted density of the negative electrode film layer and measured in $g/cm^3$;

$l_a$ is a mass ratio of the negative electrode active material to the negative electrode film layer; and $I_e$ is a ratio of a mass of the electrolyte to a total mass of the electrolyte, the positive electrode active material, and the negative electrode active material in the secondary battery.

The inventors have found through a rigorous study that combination of the first material and the second material allows different active materials to complement and supplement each other, so that the positive electrode active material has both higher gram capacity and higher cycling stability. In this case, if the secondary battery using the combined positive electrode active material satisfies that a value of $d_c \times l_c \times d_a \times l_a / I_e$ of the secondary battery is within the specific range, the secondary battery can have a higher ratio of active material per unit volume, and its entire cell has good electrolyte infiltration and retention, so that capacity of the active material can be effectively extracted, thereby effectively increasing the energy density of the secondary battery. In addition, even at an end of a cycle, the entire battery cell can still be effectively infiltrated by the electrolyte, which ensures a good ion migration interface inside the battery cell; and the positive electrode active material has good cycling stability. Therefore, the secondary battery can also have higher cycling performance.

In any one of the foregoing embodiments of the first aspect of this disclosure, the secondary battery can satisfy:

$$10 \le \frac{d_c \times l_c \times d_a \times l_a}{I_e} \le 55; \text{ and optionally } 25 \le \frac{d_c \times l_c \times d_a \times l_a}{I_e} \le 50.$$

The secondary battery satisfies that the value of $d_c \times l_c \times d_a \times l_a / I_e$ is within the foregoing range, thereby better implementing both the high energy density and long cycle life for the secondary battery.

In any one of the foregoing embodiments of the first aspect of this disclosure, the compacted density $d_c$ of the positive electrode film layer is 2.1 $g/cm^3$ to 4.2 $g/cm^3$, and optionally 2.8 $g/cm^3$ to 3.6 $g/cm^3$. The compacted density of the positive electrode film layer is within the proper range, thereby further increasing the energy density and improving the cycling performance of the secondary battery.

In any one of the foregoing embodiments of the first aspect of this disclosure, the mass ratio $l_c$ of the positive electrode active material to the positive electrode film layer is 0.85 to 0.99, and optionally 0.90 to 0.985. The positive electrode film layer includes more positive electrode active material, so that the secondary battery can have higher energy density.

In any one of the foregoing embodiments of the first aspect of this disclosure, the compacted density $d_a$ of the negative electrode film layer is 1.0 g/cm³ to 2.2 g/cm³, and optionally 1.2 g/cm³ to 1.85 g/cm³. The compacted density of the negative electrode film layer is within the proper range, thereby further increasing the energy density and improving the cycling performance of the secondary battery.

In any one of the foregoing embodiments of the first aspect of this disclosure, the mass ratio $l_a$ of the negative electrode active material to the negative electrode film layer is 0.85 to 0.99, and optionally 0.90 to 0.985. The negative electrode film layer includes more negative electrode active material, so that the secondary battery can have higher energy density.

In any one of the foregoing embodiments of the first aspect of this disclosure, the ratio $I_e$ of the mass of the electrolyte to the total mass of the electrolyte, the positive electrode active material, and the negative electrode active material in the secondary battery is 0.1 to 0.5, and optionally 0.1 to 0.3. A proper value of $I_e$ can ensure that the secondary battery has better cycling performance and improved energy density.

In any one of the foregoing embodiments of the first aspect of this disclosure, the secondary battery further satisfies:

$$0.03 \leq \frac{\varepsilon_c \times \varepsilon_a \times \sigma}{\theta'} \leq 8; \text{ and optionally } 0.03 \leq \frac{\varepsilon_c \times \varepsilon_a \times \sigma}{\theta'} \leq 6.5; \text{ or}$$

$$\text{optinally } 0.15 \leq \frac{\varepsilon_c \times \varepsilon_a \times \sigma}{\theta'} \leq 4; \text{ and optionally } 0.48 \leq \frac{\varepsilon_c \times \varepsilon_a \times \sigma}{\theta'} \leq 2.2;$$

where σ is ionic conductivity of the electrolyte at 25° C. and measured in mS/cm;

$\varepsilon_c$ is porosity of the positive electrode film layer;

$\varepsilon_a$ is porosity of the negative electrode film layer; and

θ' is an electrolyte contact angle of the positive electrode film layer and measured in radian.

The inventors have also found through an intensive study that when the secondary battery satisfies the foregoing relationship, it can be ensured that the battery cell has an ion migration medium that satisfies electrochemical performance of the battery cell, and it can also be ensured that the battery cell has a good solid-liquid contact interface during electrochemical cycling, which can further improve a cycling capacity retention rate, so that the battery has higher cycling performance.

In any one of the foregoing embodiments of the first aspect of this disclosure, the porosity $\varepsilon_c$ of the positive electrode film layer is 10% to 50% and optionally 20% to 30%. The porosity of the positive electrode film layer is within the proper range, so that the secondary battery has both increased cycle life and higher energy density.

In any one of the foregoing embodiments of the first aspect of this disclosure, the porosity $\varepsilon_a$ of the negative electrode film layer is 10% to 50%, and optionally 20% to 30%. The porosity of the negative electrode film layer is within the proper range, so that the secondary battery has both increased cycle life and higher energy density.

In any one of the foregoing embodiments of the first aspect of this disclosure, the ionic conductivity σ of the electrolyte at 25° C. is 0.5 mS/cm to 50 mS/cm, optionally 2 mS/cm to 30 mS/cm, and further optionally 3 mS/cm to 20 mS/cm. The electrolyte has higher ionic conductivity, which can further improve the cycling performance of the secondary battery.

In any one of the foregoing embodiments of the first aspect of this disclosure, the electrolyte contact angle θ of the positive electrode film layer satisfies 0°≤θ≤75°, and optionally is 35°≤θ≤45°. In this disclosure, when the electrolyte contact angle of the positive electrode film layer is within the foregoing range, the positive electrode plate has good affinity for the electrolyte, which can further improve the cycling performance and kinetic performance of the secondary battery.

In any one of the foregoing embodiments of the first aspect of this disclosure, a median particle size by volume $D_v50$ of the first material is 0.1 μm to 30 μm, optionally 2 μm to 15 μm, and further optionally 3 μm to 8 μm. $D_v50$ of the first material is within the proper range, thereby further increasing the energy density and improving the cycling performance of the secondary battery.

In any one of the foregoing embodiments of the first aspect of this disclosure, the first material includes one or more of single particles and secondary particles. Using the positive electrode active material with the single-particle morphology can improve the cycling performance of the battery. When the single particles are combined with an appropriate amount of secondary particles, ease of processing of a positive electrode slurry is improved, and the compacted density of the positive electrode film layer is improved, so that the secondary battery has higher energy density. In some embodiments, a number percentage of the single particles in the first material is 50% to 100%, and optionally 80% to 100%.

In any one of the foregoing embodiments of the first aspect of this disclosure, a median particle size by volume $D_v50$ of the second material is 0.01 μm to 15 μm, and optionally 2 μm to 9 μm. $D_v50$ of the second material is within the range, thereby further improving the cycling performance and increasing the energy density of the secondary battery.

In any one of the foregoing embodiments of the first aspect of this disclosure, the second material includes secondary particles. In some embodiments, a number percentage of the secondary particles in the second material is 70% to 100%, 80% to 100%, or 90% to 100%. The second material satisfies the foregoing condition, thereby further improving the cycling performance of the secondary battery.

In any one of the foregoing embodiments of the first aspect of this disclosure, a mass ratio of the first material to the second material is 99.9:0.1 to 50:50, optionally 97:3 to 65:35, and further optionally 97:3 to 70:30. The ratio of the first material to the second material is proper, thereby better balancing the high gram capacity and the high cycling stability of the positive electrode active material.

In any one of the foregoing embodiments of the first aspect of this disclosure, the first material is selected from one or more of a lithium nickel cobalt manganese oxide, a lithium nickel cobalt aluminum oxide, a lithium cobalt oxide, and their respective modified compounds. In some embodiments, the first material includes the lithium nickel cobalt manganese oxide. In some embodiments, a molar ratio of nickel to transition metal in the first material is more than 50%. The foregoing positive electrode active material is used as the first material in this disclosure, which can improve the energy density of the secondary battery and can further improve stability of the second material.

In any one of the foregoing embodiments of the first aspect of this disclosure, the second material is selected from one or more of lithium iron phosphate, lithium manganese phosphate, lithium manganese iron phosphate, lithium vanadium iron phosphate, and their respective modified compounds. In some embodiments, the second material contains lithium iron phosphate. In some embodiments, at least part of a surface of the second material has a carbon coating layer. The foregoing positive electrode active material is used as the second material in this disclosure, which can improve the cycling performance of the secondary battery.

In any one of the foregoing embodiments of the first aspect of this disclosure, the negative electrode active material includes one or more of artificial graphite, natural graphite, silicon-based material, and tin-based material. In some embodiments, the negative electrode active material includes one or more of artificial graphite and natural graphite.

A second aspect of this disclosure provides a preparation method of a secondary battery, including the following steps:

preparing a positive electrode slurry by using a positive electrode active material, where the positive electrode active material includes a first material and a second material, the first material contains one or more of layered lithium transition metal oxides and their modified compounds, and the second material contains one or more of an olivine-structured lithium-containing phosphate and its modified compounds;

applying the positive electrode slurry on at least one surface of a positive electrode current collector to form a positive electrode film layer, to obtain a positive electrode plate; and assembling the positive electrode plate, a negative electrode plate, and an electrolyte into the secondary battery, where the negative electrode plate includes a negative electrode current collector and a negative electrode film layer that is disposed on at least one surface of the negative electrode current collector and that includes a negative electrode active material;

where the secondary battery satisfies $$4 \leq \frac{d_c \times l_c \times d_a \times l_a}{I_e} \leq 90,$$

where $d_c$ is compacted density of the positive electrode film layer and measured in g/cm³;

$l_c$ is a mass ratio of the positive electrode active material to the positive electrode film layer;

$d_a$ is compacted density of the negative electrode film layer and measured in g/cm³;

$l_a$ is a mass ratio of the positive electrode active material to the negative electrode film layer; and $I_e$ is a ratio of a mass of the electrolyte to a total mass of the electrolyte, the positive electrode active material, and the negative electrode active material in the secondary battery.

In the preparation method of a secondary battery provided in this disclosure, the first material and the second material are combined, which can better achieve complementarity and collaboration for different active materials, so that the positive electrode active material has both higher gram capacity and higher cycling stability. In this case, the secondary using the combined positive electrode active material satisfies that a value of $d_c \times l_c \times d_a \times l_a / I_e$ of the secondary battery is within the specific range, and therefore, the secondary battery can have a higher ratio of active material per unit volume, and its entire cell has good electrolyte infiltration and retention, so that capacity of the active material can be effectively extracted, thereby effectively improving the energy density of the secondary battery. In addition, even at an end of a cycle, the entire battery cell can still be effectively infiltrated by the electrolyte, which ensures a good ion migration interface inside the battery cell; and the positive electrode active material has good cycling stability. Therefore, the secondary battery can also have higher cycling performance.

In any one of the foregoing embodiments of the second aspect of this disclosure, viscosity of the positive electrode slurry is 4000 mPa·s to 15000 mPa·s, and optionally 6000 mPa·s to 10000 mPa·s. The viscosity of the positive electrode slurry is within the foregoing range, so that processing efficiency of the secondary battery can be improved, and the cycling performance of the secondary battery can also be improved.

In any one of the foregoing embodiments of the second aspect of this disclosure, a solid content in the positive electrode slurry is 60% to 80%, and optionally 65% to 75%. The solid content in the positive electrode slurry is within the foregoing range, so that processing efficiency of the secondary battery can be improved, and the cycling performance of the secondary battery can also be improved.

A third aspect of this disclosure provides a battery module, including the secondary battery in the first aspect of this disclosure, or the secondary battery obtained in the preparation method in the second aspect of this disclosure.

A fourth aspect of this disclosure provides a battery pack, including the secondary battery in the first aspect of this disclosure or the battery module in the third aspect of this disclosure.

A fifth aspect of this disclosure provides an apparatus, including at least one of the secondary battery in the first aspect of this disclosure, the battery module in the third aspect of this disclosure, or the battery pack in the fourth aspect of this disclosure.

The battery module, the battery pack, and the apparatus in this disclosure include the secondary battery, and therefore have at least the same advantages as the secondary battery.

DESCRIPTION OF EMBODIMENTS

Figure 1:
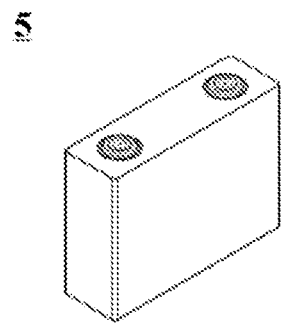
FIG. 1 is a schematic diagram of an embodiment of a secondary battery.

To make the objectives, technical solutions, and beneficial technical effects of this disclosure clearer, the following describes this disclosure in detail with reference to specific embodiments. It should be understood that the embodiments described in this specification are merely intended to interpret this disclosure, but not intended to limit this disclosure.

For simplicity, only some numerical ranges are expressly disclosed in this specification. However, any lower limit may be combined with any upper limit to form a range not expressly recorded; any lower limit may be combined with any other lower limit to form a range not expressly recorded; and any upper limit may be combined with any other upper limit to form a range not expressly recorded. In addition, although not expressly recorded, each point or individual value between endpoints of a range is included in the range. Therefore, each point or individual value may itself be used as a lower limit or upper limit to be combined with any other point or individual value or combined with any other lower limit or upper limit to form a range not expressly recorded.

In the descriptions of this specification, it should be noted that "more than" or "less than" is inclusive of the present number and that "more" in "one or more" means two or more than two, unless otherwise specified.

In the descriptions of this specification, unless otherwise stated, a term "or" is inclusive. For example, a phrase "A or B" means "A, B, or both A and B". More specifically, any one of the following conditions satisfies a condition "A or B": A is true (or present) and B is false (or not present); A is false (or not present) and B is true (or present); or both A and B are true (or present).

The foregoing invention content of this disclosure is not intended to describe each of the disclosed embodiments or implementations of this disclosure. The following descriptions use examples to illustrate exemplary embodiments in detail. Throughout this disclosure, a series of embodiments are used for providing instructions and the embodiments may be combined in various forms for use. In the embodiments, enumeration is only representative but should not be interpreted to be exhaustive.

The inventors have found that energy density and cycling performance are two conflicting types of electrical performance of a secondary battery, and that increasing energy density usually results in loss of cycling capacity, and vice versa. Consequently, it is difficult to obtain a satisfactory result to improve energy density of the secondary battery only from the perspective of active material or other chemical systems while expecting higher cycling performance.

The inventors have further conducted a lot of studies, and proposed a coupling design for the chemical system and structural parameters of the secondary battery, to achieve a purpose of endowing the secondary battery with both higher energy density and increased cycle life.

Therefore, an embodiment of the first aspect of this disclosure provides a secondary battery having both higher energy density and increased cycle life.

Secondary Battery

The secondary battery includes a positive electrode plate, a negative electrode plate, and an electrolyte, where the positive electrode plate includes a positive electrode current collector and a positive electrode film layer that is disposed on at least one surface of the positive electrode current collector and that includes a positive electrode active material, and the negative electrode plate includes a negative electrode current collector and a negative electrode film layer that is disposed on at least one surface of the negative electrode current collector and that includes a negative electrode active material; the positive electrode active material includes a first material and a second material, the first material contains one or more of layered lithium transition metal oxides and their modified compounds, and the second material contains one or more of an olivine-structured lithium-containing phosphate and its modified compounds; and the secondary battery satisfies $$4 \leq \frac{d_c \times l_c \times d_a \times l_a}{I_e} \leq 90,$$

where $d_c$ is compacted density of the positive electrode film layer and measured in $g/cm^3$;

$l_c$ is a mass ratio of the positive electrode active material to the positive electrode film layer;

$d_a$ is compacted density of the negative electrode film layer and measured in $g/cm^3$;

$l_a$ is a mass ratio of the negative electrode active material to the negative electrode film layer; and $I_e$ is a ratio of a mass of the electrolyte to a total mass of the electrolyte, the positive electrode active material, and the negative electrode active material in the secondary battery.

The inventors have found through a rigorous study that when the positive electrode active material of the secondary battery contains one or more of layered lithium transition metal oxide and its modified compounds and one or more of olivine-structured lithium-containing phosphate and its modified compounds, and the secondary battery satisfies that a value of $d_c \times l_c \times d_a \times l_a / I_e$ of the secondary battery is within a specific range, the secondary battery can have both higher energy density and better cycling performance.

Regardless of any theoretical limitation, the first material and the second material are combined, collaborative advantages of a high gram capacity of the first material and high structural stability of the second material can be exerted. In addition, the first material can also reduce precipitation of a metal (for example, Fe) in the second material, and the second material can also improve overall cycling stability of the positive electrode active material, and reduce oxygen release and an electrolyte side reaction, so that the positive electrode active material has both higher gram capacity and higher cycling stability. The secondary battery using the combined positive electrode active material satisfies that the value of $d_c \times l_c \times d_a \times l_a / I_e$ of the secondary battery is within the specific range, and therefore, the secondary battery can have a higher ratio of active material per unit volume, and its entire cell has good electrolyte infiltration and retention, so that capacity of the active material can be effectively extracted, thereby effectively increasing the energy density of the secondary battery. In addition, even at an end of a cycle, the entire battery cell can still be effectively infiltrated by the electrolyte, which ensures a good ion migration interface inside the battery cell; and the positive electrode active material with good overall stability ensures good migration performance for deintercalation or intercalation of active ions inside the material. Therefore, the secondary battery can also have higher cycling performance.

The second material is combined with the first material, and therefore, oxygen release and the electrolyte side reaction can be reduced, so that the positive electrode active material has higher thermal stability, thereby further improving the safety performance of the secondary battery.

For ease of description, $$E = \frac{d_c \times l_c \times d_a \times l_a}{I_e}$$

is defined. In this disclosure, $$E = \frac{d_c \times l_c \times d_a \times l_a}{I_e}$$

only involves numeric calculation.

For example, the compacted density $d_c$ of the positive electrode film layer is 3.22 g/cm³, the mass ratio $l_c$ of the positive electrode active material to the positive electrode film layer is 0.97, the compacted density $d_a$ of the negative electrode film layer is 1.50 g/cm³, the mass ratio $l_a$ of the negative electrode active material to the negative electrode film layer is 0.97, and the ratio $I_e$ of the mass of the electrolyte to the total mass of the electrolyte, the positive electrode active material, and the negative electrode active material in the secondary battery is 0.10, and therefore, $$E = \frac{3.22 \times 0.97 \times 1.50 \times 0.97}{0.10} = 45.4.$$

In some embodiments, the secondary battery can satisfy that E is equal to or greater than 10, 15, 20, 25, 30, 35, 40, or 45. Increasing a value of E within a specific range helps increase the energy density of the secondary battery. In some embodiments, E is less than or equal to 85, 80, 75, 70, 65, 60, 55, or 50. The secondary battery satisfies that the value of E is within the foregoing range, which helps improve the cycling performance of the secondary battery.

In some embodiments, 10≤E≤55. In some embodiments, 25≤E≤50, 30≤E≤55, 40≤E≤55, 40≤E≤50, or the like. The value of E of the secondary battery is within the given range, which can better balance high energy density and long cycle life.

In some embodiments, the secondary battery can also satisfy:

$$0.03 \leq \frac{\varepsilon_c \times \varepsilon_a \times \sigma}{\theta'} \leq 8.$$

In this formula, σ is ionic conductivity of the electrolyte at 25° C. and measured in mS/cm; $\varepsilon_c$ is porosity of the positive electrode film layer; $\varepsilon_a$ is porosity of the negative electrode film layer; θ' is an electrolyte contact angle of the positive electrode film layer and measured in radian (rad).

The inventors have also found through an intensive study that when the secondary battery satisfies the foregoing relationship, the battery can have higher cycling performance. Regardless of any theoretical limitation, when the electrolyte, the positive electrode film layer, and the negative electrode film layer of the secondary battery satisfy the foregoing relationship, it can be ensured that the battery cell has an ion migration medium that satisfies electrochemical performance of the battery cell, and it can also be ensured that the battery cell has a good solid-liquid contact interface during electrochemical cycling, which can further improve a cycling capacity retention rate, so that the battery has better cycling performance.

For ease of description, $$CL = \frac{\varepsilon_c \times \varepsilon_a \times \sigma}{\theta'}$$

is defined. In this disclosure, likewise, $$CL = \frac{\varepsilon_c \times \varepsilon_a \times \sigma}{\theta'}$$

only involves numeric calculation.

For example, the ionic conductivity σ of the electrolyte at 25° C. is 10 mS/cm; the porosity $\varepsilon_c$ of the positive electrode film layer is 24%; the porosity $\varepsilon_a$ of the negative electrode film layer is 22%; the electrolyte contact angle θ of the positive electrode film layer is 39°, that is, θ' is 0.68 radians, and therefore, $$CL = \frac{24\% \times 22\% \times 10}{0.68} = 0.78.$$

In some embodiments, the secondary battery can satisfy that CL is equal to or greater than 0.03, 0.05, 0.08, 0.1, 0.15, 0.2, 0.3, 0.4, 0.45, 0.5, 0.55, 0.6, 0.65, or 0.7. In some embodiments, CL is less than or equal to 8, 7, 6.5, 6, 5, 4, 3, 2.5, 2.2, 2, 1.4, 1.2, 1, 0.95, or 0.9. In some embodiments, 0.03≤CL≤6.5, 0.1≤CL≤6, 0.1≤CL≤5, 0.15≤CL≤4, 0.1≤CL≤3, 0.03≤CL≤2.2, 0.48≤CL≤2.2, 0.1≤CL≤2, 0.08≤CL≤1.5, 0.25≤CL≤1.4, 0.48≤CL≤1.4, 0.55≤CL≤1.3, 0.6≤CL≤1.2, 0.7≤CL≤1, or the like. When a value of CL of the secondary battery is within the given range, the cycling performance of the secondary battery can be further improved, and the secondary battery is also endowed with higher energy density.

In accordance with this disclosure, the secondary battery may be formed by encapsulating the battery cell and the electrolyte in an outer package. The battery cell can be formed by a positive electrode plate, a separator, and a negative electrode plate through a stacking process or a winding process, and the separator is located between the positive electrode plate and the negative electrode plate for isolation.

Positive Electrode Plate

The positive electrode plate includes a positive electrode current collector and a positive electrode film layer that is disposed on at least one surface of the positive electrode current collector and that includes a positive electrode active material, the positive electrode active material includes a first material and a second material, the first material contains one or more of layered lithium transition metal oxides and their modified compounds, and the second material contains one or more of an olivine-structured lithium-containing phosphate and its modified compounds.

In accordance with this disclosure, the "modified compound" is a compound obtained through doping modification or coating modification performed on a material.

In some embodiments, the first material is selected from one or more of a lithium nickel cobalt manganese oxide, a lithium nickel cobalt aluminum oxide, a lithium cobalt oxide, and their respective modified compounds. In some embodiments, the first material includes the lithium nickel cobalt manganese oxide. These positive electrode materials have a higher gram capacity, which can increase the energy density of the secondary battery. In addition, a surface of the first material is usually alkaline, which can consume acid (for example, HF) in the battery, to reduce metal precipitation of the second material, thereby further improving overall stability of the positive electrode active material and improving the cycling performance of the secondary battery.

In some embodiments, a molar ratio of nickel to transition metal in the first material is more than 50%. The molar ratio of nickel in the first material is relatively high, which can further improve a gram capacity of the first material.

In some embodiments, the first material contains one or more of $Li_{1+x}Ni_aCo_bM_{1-a-b}O_{2-y}A_y$ and its modified compounds, where −0.1≤x≤0.2, 0.5≤a<0.95, 0<b<0.2, 0<a+b<1, and $0 \leq y < 0.2$, M is selected from one or more of Mn, Fe, Cr, Ti, Zn, V, Al, Zr, or Ce, and A is selected from one or more of S, F, Cl, or I. In some embodiments, $0.5 \leq a \leq 0.85$, $0.5 \leq a \leq 0.8$, or $0.5 \leq a \leq 0.7$. In some embodiments, M contains Mn.

In some embodiments, a median particle size by volume $D_v50$ of the first material is 0.1 μm to 30 μm. In some embodiments, $D_v50$ of the first material is 1 μm to 20 μm, 2 μm to 15 μm, 3 μm to 12 μm, 3 μm to 10 μm, 3 μm to 8 μm, or 4 μm to 7 μm. $D_v50$ of the first material is within a proper range, so that the positive electrode film layer obtains higher compacted density with proper porosity, to satisfy an electrolyte infiltration volume required for an electrochemical reaction. In addition, the positive electrode film layer also has a shorter migration path of active ions and electrons within a particle, which can increase the energy density and improve the cycling performance of the battery. In addition, $D_v50$ of the first material is proper, which can further ensure that the first material has a sufficient specific surface area, to improve infiltration of the electrolyte on a surface of the first material, that is, to make the electrolyte contact angle smaller, so that the positive electrode has a good reaction interface, thereby reducing irreversible loss of active lithium and improving the cycling performance of the secondary battery.

In some embodiments, the first material includes one or more of single particles and secondary particles.

In the first material in this disclosure, single particles are discrete primary particles, or particles formed by agglomeration of a small number of (for example, 2 to 5) primary particles. In some embodiments, in the single particles, a particle size of primary particles is not less than 1 μm. Secondary particles are a form of particles formed by agglomeration of a large number of primary particles, where a particle size of the primary particles is not greater than 500 nm. The large number is, for example, more than 100, 300, 500, or 800.

Single-particle morphology of the positive electrode active material helps reduce polarization and further reduce side reaction at a positive electrode interface, thereby improving the cycling performance of the battery. When the single particles are combined with an appropriate amount of secondary particles, ease of processing of a positive electrode slurry is improved, and the compacted density of the positive electrode film layer is improved, thereby increasing the energy density of the battery. In some embodiments, a number percentage of the single particles in the first material is 50% to 100%, or is optionally 80% to 100%, 90% to 100%, 85% to 95%, or 90% to 95%.

The inventors have also found that $D_v50$ and particle morphology of the first material are properly matched, which can not only ensure that the positive electrode active material has higher active ion migration performance to reduce the side reaction with the electrolyte, but also ensure that the secondary battery achieves higher compacted density of the positive electrode film layer, thereby better improving the energy density and cycling performance of the secondary battery. In some embodiments, $D_v50$ of the first material is 2 μm to 8 μm, and a number percentage of the single particles in the first material is 50% to 100%. In some embodiments, $D_v50$ is 3 μm to 8 μm, 3 μm to 6 μm, 4 μm to 6 μm, or 4 μm to 7 μm. In some embodiments, a number percentage of the single particles in the first material is 70% to 100%, 80% to 100%, 90% to 100%, 85% to 95%, or 90% to 95%.

In some embodiments, the second material is selected from one or more of lithium iron phosphate ($LiFePO_4$, LFP), lithium manganese phosphate ($LiMnPO_4$), lithium manganese iron phosphate ($LiMn_{1-\alpha}Fe_\alpha PO_4$, where $0 < \alpha < 1$, and optionally $0.5 \leq \alpha \leq 0.8$), lithium vanadium iron phosphate ($LiV_{1-\beta}Fe_\beta PO_4$, where $0 < \beta < 1$, and optionally $0.5 \leq \beta \leq 0.9$), and their respective modified compounds. In some embodiments, the second material contains lithium iron phosphate. These positive electrode materials have higher structural stability and thermal stability. These materials are combined with the first material, the obtained positive electrode active material can have higher overall cycling stability, less oxygen is released, and the electrolyte side reaction is reduced. In addition, the use of the positive electrode active material can also improve the electrolyte infiltration and a liquid retention rate of the positive electrode film layer, and improve stability of a positive electrode interface, thereby improving the cycling performance of the secondary battery. In particular, when the second material (for example, LFP) has a lower platform voltage, internal resistance of the secondary battery in a low state of charge (SOC) can also be reduced, to alleviate the rapid drop of capacity of the battery in the low SOC, thereby reducing resulting capacity loss and further improving the cycling performance of the secondary battery.

In some embodiments, at least part of a surface of the second material has a carbon coating layer. In some embodiments, the entire surface of the second material is coated with the carbon coating layer. The carbon coating layer can improve electronic conductivity of the second material, thereby improving overall electronic conductivity performance of the positive electrode active material and further improving the cycling performance of the battery.

In some embodiments, a median particle size by volume $D_v50$ of the second material is 0.01 μm to 15 nm. In some embodiments, $D_v50$ of the second material is 0.5 m to 12 μm, 1 μm to 10 μm, 2 m to 9 μm, 2.5 μm to 8 μm, or 4 μm to 7 μm. $D_v50$ of the second material is in the proper range, so that the secondary battery using the second material can have lower impedance, thereby improving power performance and the cycling performance. $D_v50$ of the second material is proper, so that the processing performance of the positive electrode slurry can be further improved and the compacted density of the positive electrode film layer is improved, thereby increasing the energy density of the battery.

In some embodiments, the second material includes secondary particles. In some embodiments, a number percentage of the secondary particles in the second material is 70% to 100%, 80% to 100%, or 90% to 100%. The second material satisfies the foregoing condition, which can further improve the ionic and electronic conductivity performance of the positive electrode active material and reduce battery impedance, so that the secondary battery has higher cycling performance.

In the second material in this disclosure, secondary particles are a form of particles formed by agglomeration of a plurality of primary particles, where a particle size of the primary particles is not greater than 500 nm, and In some embodiments, the particle size of the primary particles in the secondary particle is 10 nm to 500 nm, 100 nm to 500 nm, or the like.

In some embodiments, a mass ratio of the first material to the second material is 99.9:0.1 to 50:50. In some embodiments, the mass ratio of the first material to the second material is 97:3 to 65:35, 97:3 to 70:30, 97:3 to 90:10, or 97:3 to 95:5. The ratio of the first material to the second material is proper, which can better achieve complementarity and collaboration for the two materials, so that the secondary battery better balances the high energy density and long cycle life. In addition, when the ratio of the first material to the second material is within the proper range, porosity of the positive electrode film layer can be adjusted to a specific extent, so that the positive electrode film layer is better infiltrated by the electrolyte, thereby further improving the cycling performance of the battery.

In the positive electrode plate in this disclosure, the positive electrode film layer usually includes the positive electrode active material and optionally a binder and a conductive agent, and is usually formed after coating of a positive electrode slurry, following by drying and cold-pressing. The positive electrode slurry is usually formed by dispersing the positive electrode active material and In some embodiments, the conductive agent, the binder and the like in a solvent and stirring them evenly. The solvent may be N-methylpyrrolidone (NMP).

In some embodiments, the mass ratio $1_c$ of the positive electrode active material to the positive electrode film layer is 0.85 to 0.99, and optionally 0.90 to 0.985, 0.95 to 0.99, or 0.95 to 0.97. The positive electrode film layer includes more positive electrode active material, so that the secondary battery can have higher energy density.

In some embodiments, the binder of the positive electrode film layer may include one or more of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and their modified polymers.

In some embodiments, the conductive agent of the positive electrode film layer may include one or more of superconducting carbon, carbon black (for example, Super P, acetylene black, or Ketjen black), carbon dots, carbon nanotubes, graphene, and carbon nanofibers.

In some embodiments, the compacted density $d_c$ of the positive electrode film layer is 2.1 $g/cm^3$ to 4.2 $g/cm^3$, and In some embodiments, 2.8 $g/cm^3$ to 3.9 $g/cm^3$, 2.8 $g/cm^3$ to 3.6 $g/cm^3$, 2.9 $g/cm^3$ to 3.65 $g/cm^3$, 3.0 $g/cm^3$ to 3.8 $g/cm^3$, 3.2 $g/cm^3$ to 3.6 $g/cm^3$, or 3.2 $g/cm^3$ to 3.5 $g/cm^3$. The compacted density of the positive electrode film layer is within the proper range, so that the secondary battery has higher energy density. In addition, the positive electrode film layer can also have a porous structure suitable for the electrolyte infiltration, so that the secondary battery can have higher cycling performance.

In some embodiments, the porosity $\varepsilon_c$ of the positive electrode film layer is 10% to 50%, and optionally 17% to 35%, 20% to 30%, or 22% to 27%. The porosity of the positive electrode film layer is within a proper range, which can not only ensure that the film layer has a higher ratio of active materials, but also ensure that the positive electrode film layer has good electrolyte infiltration, thereby ensuring sufficient ion migration media required for an electrochemical reaction and effectively exerting the capacity of the battery cell, so that the secondary battery has increased cycle life and higher energy density.

In some embodiments, the electrolyte contact angle θ of the positive electrode film layer satisfies 0°≤θ≤75°, and optionally 15°≤θ≤75°, 25°≤θ≤70°, 20°≤θ≤60°, 25°≤θ≤55°, 30°≤θ≤50°, or 35°≤θ≤45°. The electrolyte contact angle of the positive electrode film layer is in the proper range, which not only facilitates the electrolyte infiltration, but also improves a solid-liquid contact interface in the film layer, thereby further improving the cycling performance of the secondary battery. Herein, 1°=π/180 radians. Therefore, conversion can be performed between θ and θ'.

Negative Electrode Plate

In the negative electrode plate in this disclosure, the negative electrode plate includes a negative electrode current collector and a negative electrode film layer disposed on at least one surface of the negative electrode current collector.

The negative electrode film layer usually includes a negative electrode active material and In some embodiments, a binder and a conductive agent, and other optional additives. The negative electrode film layer is usually formed through coating of a negative electrode slurry on the negative electrode current collector, drying, and cold-pressing. The negative electrode slurry is usually formed by dispersing the negative electrode active material and In some embodiments, the conductive agent, the binder, the additive, and the like in a solvent and stirring them evenly. The solvent may be N-methylpyrrolidone (NMP) or deionized water.

In some embodiments, a mass ratio $1_a$ of the negative electrode active material to the negative electrode film layer is 0.85 to 0.99, and optionally 0.90 to 0.985, 0.95 to 0.99, or 0.95 to 0.97. The negative electrode film layer includes more negative electrode active material, so that the secondary battery can have higher energy density.

In some embodiments, the negative electrode active material can include one or more of artificial graphite, natural graphite, silicon-based material, and tin-based material. These negative electrode materials have a higher gram capacity, so that the secondary battery has higher energy density. In some embodiments, the negative electrode active material includes one or more of artificial graphite and natural graphite. A graphite material not only has a higher gram capacity, but also has higher ion and electron migration properties and higher cycling stability and lower cycle expansion, so that the secondary battery has higher energy density and cycling performance.

In some embodiments, the conductive agent may include one or more of superconducting carbon, carbon black (for example, Super P, acetylene black, or Ketjen black), carbon dots, carbon nanotubes, graphene, and carbon nanofibers.

In some embodiments, the binder may include one or one of styrene-butadiene rubber (SBR), water-borne acrylic resin, polyvinyl alcohol (PVA), sodium alginate (SA), and carboxymethyl chitosan (CMCS).

In some embodiments, the other optional additives are, for example, a thickener (such as sodium carboxymethyl cellulose, CMC-Na) and a PTC thermistor material.

In some embodiments, the compacted density $d_a$ of the negative electrode film layer is 1.0 $g/cm^3$ to 2.2 $g/cm^3$, and optionally 1.2 $g/cm^3$ to 2.0 $g/cm^3$, 1.2 $g/cm^3$ to 1.85 $g/cm^3$, 1.5 $g/cm^3$ to 1.85 $g/cm^3$, or 1.5 $g/cm^3$ to 1.65 $g/cm^3$. The compacted density of the negative electrode film layer is within the proper range, so that the secondary battery has higher energy density. In addition, the negative electrode film layer can also have a pore structure suitable for the electrolyte infiltration, so that the secondary battery can have higher cycling performance.

In some embodiments, the porosity ea of the negative electrode film layer is 10% to 50%, and optionally 20% to 30%, or 22% to 28%. The porosity of the negative electrode film layer is within a proper range, which can not only ensure that the film layer has a higher ratio of active materials, but also ensure that the negative electrode film layer has good electrolyte infiltration, thereby effectively exerting the capacity of the battery cell and reducing rapid capacity drop caused by a shortage of electrolyte, so that the secondary battery has increased cycle life and higher energy density.

Separator

The separator is disposed between the positive electrode plate and the negative electrode plate for isolation. A type of the separator is not particularly limited for the secondary battery in this disclosure, and any well-known separator with a porous structure used for the secondary battery can be selected. For example, the separator may be selected from one or more of a glass fiber film, a non-woven film, a polyethylene film, a polypropylene film, a polyvinylidene fluoride film, and a multilayer composite film including one or more of them.

Electrolyte

The electrolyte is configured to transfer ions in a secondary battery. In the secondary battery in this disclosure, a ratio $I_e$ of a mass of the electrolyte to a total mass of the electrolyte, a positive electrode active material, and a negative electrode active material in the secondary battery is optionally 0.1 to 0.5, or is, for example, 0.1 to 0.4, 0.1 to 0.3, or 0.1 to 0.2. A proper value of $I_e$ can not only ensure that the secondary battery has necessary electrolyte infiltration to satisfy an electrochemical reaction, but also reduce decrease in energy density caused by increase in the electrolyte, so that the secondary battery can better balance better cycling performance and energy density.

In the secondary battery in this disclosure, ionic conductivity σ of the electrolyte at 25° C. is 0.5 mS/cm to 50 mS/cm, or is optionally 2 mS/cm to 30 mS/cm, 3 mS/cm to 20 mS/cm, 6 mS/cm to 15 mS/cm, 7 mS/cm to 15 mS/cm, or 8 mS/cm to 12 mS/cm. The electrolyte has proper ionic conductivity, which can further improve the cycling performance of the secondary battery.

In the secondary battery in this disclosure, the electrolyte includes an electrolyte lithium salt, a solvent, and In some embodiments, an additive.

In some embodiments, the lithium salt may be selected from one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimidate), LiTFS (lithium trifluoromethanesulfonate), LiDFOB (lithium difluoro(oxalato)borate), LiBOB (lithium bis(oxalato)borate), $LiPO_2F_2$ (lithium difluorophosphate), LiDFOP (lithium difluoro bis(oxalato)phosphate), and LiTFOP (lithium tetrafluoro oxalato phosphate).

In some embodiments, the solvent may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), 1,2-butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), tetramethylene sulfone (SF), methyl sulfone (MSM), ethyl methanesulfonate (EMS), and diethyl sulfone (ESE).

A proper solvent is used in the electrolyte, so that the ionic conductivity of the electrolyte at 25° C. can be within the range in this disclosure and the electrolyte contact angle of the positive electrode film layer can also be within the range in this disclosure.

In some embodiments, the additive may include an additive that can improve the ionic conductivity of the electrolyte, such as one or more of acetonitrile (AN) and ethylene glycol dimethyl ether (DME).

In some embodiments, the additive optionally includes a negative electrode film-forming additive, and further optionally includes a positive electrode film-forming additive, and further optionally includes an additive capable of improving some performance of a battery, for example, an additive for improving over-charge performance of the battery, an additive for improving high-temperature performance of the battery, and an additive for improving low-temperature performance of the battery.

In accordance with this disclosure, compacted density of the positive electrode film layer and the negative electrode film layer has a meaning known in the art, and can be tested in a method known in the art. An exemplary method for testing the compacted density of the positive electrode film layer was as follows: A positive electrode plate that was coated on one side and that was subjected to cold-pressing was fetched (if the electrode plate was coated on two sides, the positive electrode film layer on one side could be wiped off first), and punched to form a small circular plate with an area of $S_1$, and the small circular plate was weighed with a weight denoted as $M_1$; a thickness of the positive electrode film layer was measured and denoted as H; then the positive electrode film layer was wiped off, and the positive electrode current collector was weighed with a weight denoted as $M_2$; and the compacted density of the positive electrode film layer is: $d_c=(M_1-M_2)/S_1/H$. The compacted density of the negative electrode film layer could be tested in the same method.

In accordance with this disclosure, a median particle size by volume $D_v50$ of the positive electrode active material has a meaning known in the art, and can be tested in a method known in the art. For example, the median particle size by volume may be tested by using a laser particle size analyzer (such as Malvern Mastersize 3000). For the test, refer to GB/T 19077.1-2016. Herein, $D_v50$ represents a corresponding particle size when a cumulative volume distribution percentage of the positive electrode active material reaches 50%.

In accordance with this disclosure, morphology (single particles or secondary particles) of the positive electrode active material can be tested in a method known in the art. An exemplary test method was as follows: A first material was laid and pasted on a conductive adhesive to prepare a to-be-tested sample having a length of 6 cm and a width of 1.1 cm; and morphology of particles in the to-be-tested sample is tested by using a scanning electron microscope and an energy disperse spectroscopy (for example, ZEISS Sigma 300). For the test, refer to JY/T010-1996. In order to ensure accuracy of a test result, 10 different regions in the to-be-tested sample could be randomly selected for a scanning test, and under 500× magnification, based on a particle morphology characteristic, single particles in the tested regions were counted, and an average was calculated, that is, a number percentage of the single particles in the first material. Similarly, a number percentage of the secondary particles in the second material could be tested.

In accordance with this disclosure, porosity of the positive electrode film layer and the negative electrode film layer has a meaning known in the art, and can be tested in a method known in the art. For example, an AccuPyc II 1340 automatic true density tester from Micromeritics of the United States was used for the test with reference to GB/T 24586-2009.

In accordance with this disclosure, the ionic conductivity of the electrolyte has a meaning known in the art, and can be tested in a method known in the art. For example, a conductivity meter can be used. An exemplary test method was as follows: Resistance of the electrolyte under AC impedance of 1 kHz at 25° C. was tested by using the conductivity meter (for example, DDSJ-318 from Shanghai INESA Scientific Instrument Co., Ltd.), and the ionic conductivity of the electrolyte was calculated.

In accordance with this disclosure, the electrolyte contact angle of the positive electrode film layer has a meaning known in the art, and can be tested in a method known in the art. An exemplary test method was as follows: A tested sample was put on a water contact angle tester, 10 μL of the electrolyte was dropped at a height of 1 cm from the positive electrode film layer, and a water droplet falling on a surface of the sample was photographed by an optical microscope and a high-speed camera. Herein, the electrolyte was an electrolyte used for the battery. Test conditions were 25° C. and normal pressure (0.1 MPa). An included angle between a surface tangent of a contact point of the water droplet and the sample and a horizontal plane was analyzed and measured through software, that is, the contact angle.

In the foregoing tests related to the positive electrode film layer and the negative electrode film layer, the sample could be collected from a positive electrode plate that had not been assembled into the secondary battery, or the sample could be alternatively collected by disassembling the secondary battery.

In this disclosure, viscosity of the positive electrode slurry has a meaning known in the art, and can be tested in a method known in the art. For example, a Brookfield DV2T viscometer could be used for the test to obtain a viscosity value at specific temperature (for example, room temperature of 25° C.) and humidity (for example, relative humidity RH<80%).

This disclosure does not impose a special limitation on a shape of the secondary battery, and the lithium-ion battery may be cylinder-shaped, square-shaped, or in any other shape. FIG. 1 shows a secondary battery 5 of a square structure as an example.

In some embodiments, the secondary battery may include an outer package. The outer package is configured to encapsulate the battery cell and the electrolyte.

Figure 2:
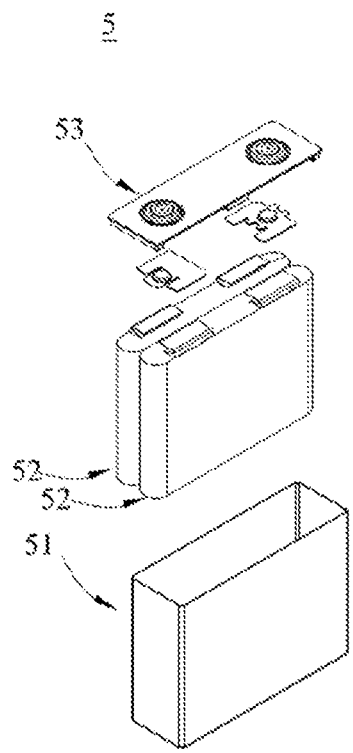
FIG. 2 is an exploded view of FIG. 1.

In some embodiments, referring to FIG. 2, the outer package may include a housing 51 and a cover plate 53. The housing 51 may include a bottom plate and a side plate connected to the bottom plate, and the bottom plate and the side plate enclose an accommodating cavity. The housing 51 has an opening connected to the accommodating cavity, and the cover plate 53 can cover the opening, to seal the accommodating cavity. A battery cell 52 is encapsulated in the accommodating cavity. The electrolyte infiltrates in the battery cell 52. The secondary battery 5 may include one or more battery cells 52, and their quantity can be adjusted based on a need.

In some embodiments, the outer package of the secondary battery may be a hard shell, for example, a hard plastic shell, an aluminum shell, or a steel shell. The outer package of the secondary battery may alternatively be a soft package, for example, a soft bag. A material of the soft package may be plastic, for example, may include one or more of polypropylene (PP), polybutylene terephthalate (PBT), polybutylene succinate (PBS), and the like.

In some embodiments, secondary batteries may be assembled into a battery module, and the battery module may include a plurality of secondary batteries. A specific quantity may be adjusted based on disclosure and a capacity of the battery module.

Figure 3:
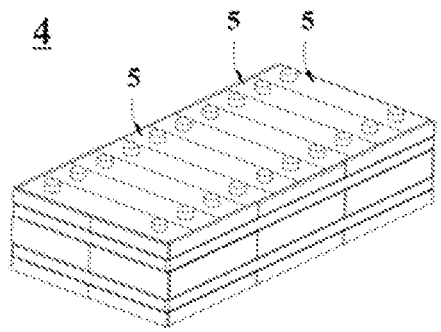
FIG. 3 is a schematic diagram of an embodiment of a battery module.

FIG. 3 shows a battery module 4 used as an example. Referring to FIG. 3, in the battery module 4, a plurality of secondary batteries 5 may be sequentially arranged in a length direction of the battery module 4. Certainly, the plurality of secondary batteries may also be arranged in any other manner. Further, the plurality of secondary batteries 5 may be fastened through a fastener.

In some embodiments, the battery module 4 may further include a housing with accommodating space, and the plurality of secondary batteries 5 are accommodated in the accommodating space.

In some embodiments, battery modules may be further assembled into a battery pack, and a quantity of battery modules included in the battery pack may be adjusted based on disclosure and a capacity of the battery pack.

Figure 4:
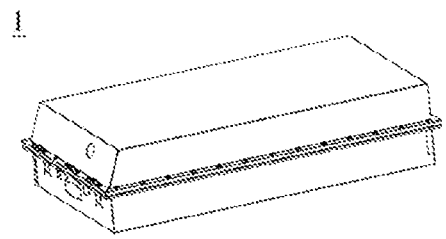
FIG. 4 is a schematic diagram of an embodiment of a battery pack.
Figure 5:
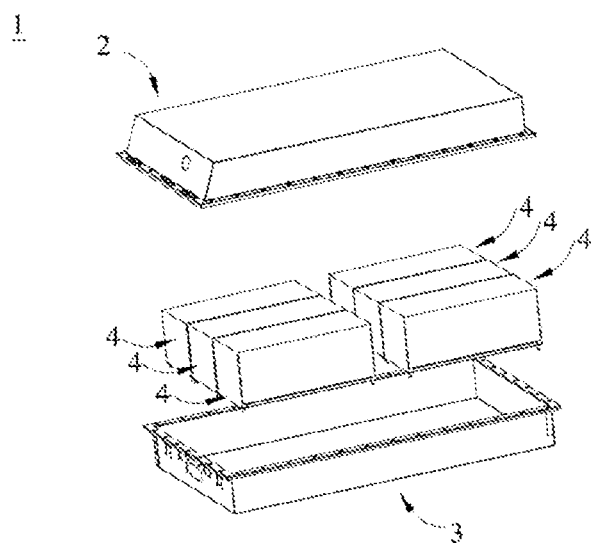
FIG. 5 is an exploded view of FIG. 4.

FIG. 4 and FIG. 5 show a battery pack 1 used as an example. Referring to FIG. 4 and FIG. 5, the battery pack 1 may include a battery box and a plurality of battery modules 4 arranged in the battery box. The battery box includes an upper box body 2 and a lower box body 3. The upper box body 2 can cover the lower box body 3 to form enclosed space for accommodating the battery modules 4. The plurality of battery modules 4 may be arranged in the battery box in any manner.

This disclosure further provides a preparation method of a secondary battery. The preparation method includes the following steps: preparing a positive electrode slurry by using a positive electrode active material, where the positive electrode active material includes a first material and a second material, the first material contains one or more of layered lithium transition metal oxides and their modified compounds, and the second material contains one or more of an olivine-structured lithium-containing phosphate and its modified compounds; applying the positive electrode slurry on at least one surface of the positive electrode current collector to form a positive electrode film layer, to obtain a positive electrode plate; and assembling the positive electrode plate, the negative electrode plate, and the electrolyte into the secondary battery, where the negative electrode plate includes a negative electrode current collector and a negative electrode film layer that is disposed on at least one surface of the negative electrode current collector and that includes a negative electrode active material, where the secondary battery satisfies:

$$4 \le \frac{d_c \times l_c \times d_a \times l_a}{I_e} \le 90.$$

In the formula, $d_c$ is compacted density of the positive electrode film layer and measured in g/cm$^3$; $l_c$ is a mass ratio of the positive electrode active material to the positive electrode film layer; $d_a$ is compacted density of the negative electrode film layer and measured in g/cm$^3$; $l_a$ is a mass ratio of the positive electrode active material to the negative electrode film layer; and $I_e$ is a ratio of a mass of the electrolyte to a total mass of the electrolyte, the positive electrode active material, and the negative electrode active material in the secondary battery.

Usually, the positive electrode active material, and optionally the binder and the conductive agent are added to a solvent (for example, NMP), and stirred and mixed evenly to obtain the positive electrode slurry.

In some embodiments, viscosity of the positive electrode slurry is 4000 mPa·s to 15000 mPa·s, and optionally 6000 mPa·s to 10000 mPa·s. The viscosity of the positive electrode slurry is within the foregoing range, so that processability of the slurry and the film layer can be improved, thereby improving processing efficiency and electrochemical performance of the secondary battery.

In some embodiments, the positive electrode slurry is allowed to stand for 48 hours during which no or almost no gelation, delamination, or sedimentation occurs. Therefore, coating evenness of the positive electrode film layer can be ensured, so that the positive electrode film layer has higher overall consistency, thereby increasing overall energy density and improving cycling performance of the battery. Herein, the slurry can be scooped up (by using, for example, a stainless steel ruler or a stainless steel plate), and the slurry flows down naturally. If it is determined, through visual observation, that the slurry continuously flows and that there is no agglomerate in the slurry, the slurry is not gelled. It can be determined, through visual observation, whether the positive electrode slurry is delaminated and sedimented.

In some embodiments, a solid content in the positive electrode slurry is 60% to 80%, and optionally 65% to 75%. The solid content in the positive electrode slurry is within the foregoing range, so that processability of the slurry and the film layer can be improved, thereby improving processing efficiency and electrochemical performance of the secondary battery.

The preparation method in this disclosure may further include other well-known steps for preparing the secondary battery. Details are not described herein.

Technical features of the secondary battery in this disclosure are also applicable to the preparation method of the secondary battery, implementing corresponding beneficial effects.

In accordance with this disclosure, materials such as the positive electrode active material and the negative electrode active material for preparing the secondary battery can be obtained commercially or prepared in a method known in the art.

This disclosure further provides an apparatus. The apparatus includes at least one of the secondary battery, the battery module, or the battery pack in this disclosure. The secondary battery, the battery module, or the battery pack may be used as a power source for the apparatus, or an energy storage unit of the apparatus. The apparatus may be, but is not limited to, a mobile device (for example, a mobile phone or a notebook computer), an electric vehicle (for example, a full electric vehicle, a hybrid electric vehicle, a plug-in hybrid electric vehicle, an electric bicycle, an electric scooter, an electric golf cart, or an electric truck), an electric train, a ship, a satellite, an energy storage system, and the like.

The secondary battery, the battery module, or the battery pack may be selected for the apparatus based on requirements for using the apparatus.

Figure 6:
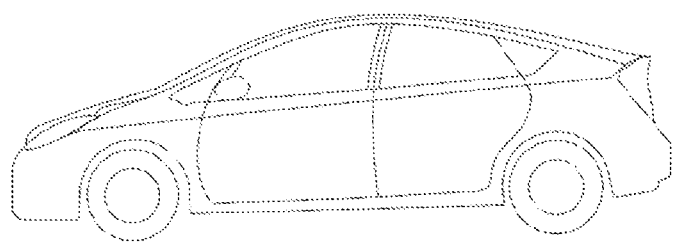
FIG. 6 is a schematic diagram of an embodiment of a device that uses a secondary battery as a power source.

FIG. 6 shows an apparatus used as an example. The apparatus is a full electric vehicle, a hybrid electric vehicle, a plug-in hybrid electric vehicle, or the like. To meet a requirement of the apparatus for high power and high energy density of a secondary battery, a battery pack or a battery module may be used.

In another example, the apparatus may be a mobile phone, a tablet computer, a notebook computer, or the like. The apparatus usually requires lightness and thinness, and the secondary battery may be used as a power source.

EXAMPLES

Content disclosed in this disclosure is described in detail in the following embodiments. These embodiments are intended only for illustrative purposes because various modifications and changes made without departing from the scope of the content disclosed in this disclosure are apparent to those skilled in the art. Unless otherwise stated, all parts, percentages, and ratios reported in the following embodiments are based on weights, all reagents used in the embodiments are commercially available or synthesized in a conventional manner, and can be used directly without further processing, and all instruments used in the embodiments are commercially available.

Performance Test

1. Energy Density Test of a Secondary Battery

A capacity, a nominal voltage, and a mass of the secondary battery were measured separately, and mass energy density could be calculated through the following formula: Mass energy density=capacity×voltage/mass.

The mass could be obtained through weighing with a balance (such as a balance JA31002 from Shanghai Sunny Hengping Scientific Instrument Co., Ltd.). The balance had readability of 0.1 g for the mass.

Method for measuring the capacity and the nominal voltage of the secondary battery:

At 25° C., the secondary battery was fully charged and then fully discharged at a charge/discharge rate of 0.33 C. A measured discharge capacity was a secondary capacity, and a voltage corresponding to half of the discharge capacity was the nominal voltage.

A test process was as follows: (1) The secondary battery was charged at a constant current rate of 0.33 C to an upper cut-off voltage, and was then charged at a constant voltage until the current was less than 0.05 C; (2) the secondary battery was allowed to stand for 10 minutes; (3) the secondary battery was discharged at a constant current of 0.33 C to a lower cut-off voltage, and in this case, a discharge capacity was denoted as a capacity of the secondary battery, and a voltage corresponding to half of the discharge capacity was the nominal voltage. For related terms and test methods, refer to GB/T 19596, GB/T 31484-2015, GB/T 31485-2015, GB/T 31486-2015 and *Electric Vehicles Traction Battery Safety Requirements*. Devices well-known in the art can be used for the test, such as a battery cell charger/discharger and high and low temperature test boxes.

2. Cycling Performance Test for the Secondary Battery

At 25° C., the secondary battery was allowed to stand for 30 minutes, then discharged at a constant current of 0.33 C to a lower cut-off voltage, allowed to stand for 5 minutes, then charged at a constant current of 0.33 C to an upper cut-off voltage, then charged at a constant voltage until the current was less than 0.05 C, allowed to stand for 5 minutes, then discharged at a constant current of 0.33 C to a lower cut-off voltage, and in this case, a discharge capacity was recorded, that is, an initial discharge capacity $C_0$. The secondary battery was tested in the foregoing method for 500 charge and discharge cycles, and the discharge capacity $C_n$ of each cycle was recorded.

Cycling performance of the secondary battery:capacity retention rate (%) at the $500^{th}$ cycle=$C_{500}/C_0 \times 100\%$.

In the test, the upper cut-off voltage and the lower cut-off voltage of the secondary battery could be determined based on a first material with a large mixture ratio. For example, the first material was $LiNi_{0.8}Co_{0.1}Mn_{0.1}O_2$ (NCM811), and a charge/discharge voltage range of the battery was 2.8 V to 4.25 V; the first material was $LiNi_{0.6}Co_{0.2}Mn_{0.2}O_2$ (NCM622), and a charge/discharge voltage range of the battery was 2.8 V to 4.35 V; or the first material was $LiNi_{0.5}Co_{0.2}Mn_{0.3}O_2$ (NCM523), and a charge/discharge voltage range of the battery was 2.8 V to 4.4 V.

1. Influence of an E value ($d_c \times l_c \times d_a \times l_a / I_e$) of a secondary battery on performance of the secondary battery

Example 1

Preparation of Positive Electrode Plate

A positive electrode active material, a conductive agent of Super P, and a binder of PVDF were fully stirred and mixed in an appropriate amount of NMP at a mass ratio of 95:3:2, to form an even positive electrode slurry. Viscosity of the positive electrode slurry was 6200 mPa·s, and the positive electrode slurry was not gelled, delaminated, or sedimented within 48 hours of standing; a solid content in the positive electrode slurry was 70% by weight; and the positive electrode active material included a first material of $LiNi_{0.5}Co_{0.2}Mn_{0.3}O_2$ (NCM523) and a second material of carbon-coated lithium iron phosphate (LFP), and a mass ratio of the first material to the second material was 9:1. $D_v50$ of the first material was 4.1 μm. A number percentage of single particles in the first material was 90%. LFP in the second material was a secondary particle. $D_v50$ of the second material was 6.9 μm.

The positive electrode slurry was coated on an aluminum foil surface of a positive electrode current collector, and was dried and cold-pressed to obtain the positive electrode plate.

Preparation of Negative Electrode Plate

A negative electrode active material graphite, a conductive agent Super P, a binder SBR, and a thickener CMC-Na were fully stirred and mixed in an appropriate volume of deionized water at a mass ratio of 95:2:2:1, to form an even negative electrode slurry. The negative electrode slurry was coated on a copper foil surface of a negative electrode current collector, and was dried and cold-pressed to obtain the negative electrode plate.

Separator

A PP/PE composite separator was used.

Preparation of Electrolyte

Ethylene carbonate (EC), diethyl carbonate (DEC), and dimethyl carbonate (DMC) were mixed at a volume ratio of 1:1:1, and then $LiPF_6$ was evenly dissolved in such solution, to obtain the electrolyte. In the electrolyte, a concentration of $LiPF_6$ was 1 mol/L. Ionic conductivity σ of the electrolyte at 25° C. was 10 mS/cm.

Preparation of Secondary Battery

A positive electrode plate, a separator, and a negative electrode plate were stacked in order, and the stack was wound to obtain an electrode assembly. The electrode assembly was put into an outer package with the foregoing prepared electrolyte added, and the mixture was subjected to processes such as packaging, standing, formation, and aging to obtain a secondary battery.

Examples 2 to 7 and Comparative Examples 1 and 2

Different from Example 1, related parameters in the steps of preparing the secondary battery were adjusted to obtain different secondary batteries. Details about the preparation parameters and test results different from those in Example 1 are given in Table 1.

TABLE 1

| Number | $l_c$ | $d_c$ (g/cm³) | $ε_c$ | $l_a$ | $d_a$ (g/cm³) | $ε_α$ | θ | $I_e$ | CL | E | Energy density (Wh/kg) | Cycling performance |
|---|---|---|---|---|---|---|---|---|---|---|---|---|
| Example 1 | 0.95 | 3.15 | 30% | 0.95 | 1.35 | 25% | 31° | 0.2 | 1.39 | 19.2 | 220 | 95% |
| Example 2 | 0.90 | 3.10 | 40% | 0.90 | 1.20 | 35% | 26° | 0.3 | 3.09 | 10.0 | 180 | 93% |
| Example 3 | 0.85 | 2.31 | 50% | 0.85 | 1.02 | 50% | 18° | 0.4 | 7.96 | 4.3 | 120 | 92% |
| Example 4 | 0.97 | 3.22 | 24% | 0.97 | 1.50 | 22% | 39° | 0.10 | 0.78 | 45.4 | 244 | 96% |
| Example 5 | 0.99 | 3.42 | 20% | 0.97 | 1.40 | 30% | 52° | 0.15 | 0.66 | 30.7 | 230 | 95% |
| Example 6 | 0.99 | 3.63 | 16% | 0.99 | 1.80 | 17% | 66° | 0.13 | 0.24 | 49.3 | 249 | 94% |
| Example 7 | 0.97 | 4.19 | 10% | 0.99 | 2.18 | 10% | 73° | 0.10 | 0.08 | 87.7 | 275 | 91% |
| Comparative Example 1 | 0.97 | 4.20 | 8% | 0.98 | 2.20 | 8% | 79° | 0.09 | 0.05 | 97.6 | 283 | 51% |
| Comparative Example 2 | 0.97 | 2.05 | 48% | 0.98 | 0.99 | 35% | 23° | 0.50 | 4.19 | 3.9 | 115 | 85% |

It can be seen from the results in Table 1 that because the secondary battery in this disclosure included both the first material and the second material, and satisfied that a value of $d_c \times l_c \times d_a \times l_a / I_e$ was within a specific range, the secondary battery could have both higher energy density and better cycling performance.

Because the secondary battery in Comparative Examples 1 and 2 did not satisfy the foregoing condition, the secondary battery had difficulty in balancing energy density and cycling performance.

2. Influence of a CL value $$\left(CL = \frac{\varepsilon_c \times \varepsilon_a \times \sigma}{\theta'}\right)$$

of a secondary battery on its performance

Examples 8 to 12

Different from Example 4, related parameters in the steps of preparing the electrolyte were adjusted to obtain corresponding secondary batteries. In the electrolyte in Example 9, $LiN(CF_3SO_2)_2$ (LiFSI) was used as lithium salt. Other different preparation parameters and test results are detailed Table 2.

TABLE 2

| Number | Electrolyte Composition and volume ratio | Lithium salt concentration (mol/L) | σ (mS/cm) | θ | CL | E | Energy density (Wh/kg) | Cycling performance |
|---|---|---|---|---|---|---|---|---|
| Example 4 | EC + DEC + DMC 1:1:1 | 1.0 | 10.0 | 39° | 0.78 | 45.4 | 244 | 96% |
| Example 8 | EC + DEC + EMC 1:1:1 | 1.0 | 14.0 | 35° | 1.21 | 45.4 | 244 | 94% |
| Example 9 | PC + DEC 1:1 | 0.1 | 0.6 | 57° | 0.03 | 45.4 | 244 | 92% |
| Example 10 | EC + AN 1:4 | 2.0 | 42.0 | 21° | 6.05 | 45.4 | 244 | 89% |
| Example 11 | EC + DEC 1:1 | 1.2 | 7.2 | 45° | 0.48 | 45.4 | 244 | 95% |
| Example 12 | EC + AN + DME 5:4:1 | 1.5 | 21.0 | 29° | 2.19 | 45.4 | 244 | 91% |

It can be seen from Table 2 that the secondary battery satisfied that $$\frac{\varepsilon_c \times \varepsilon_a \times \sigma}{\theta'}$$

was within a proper range, so that the cycling performance of the secondary battery could be further improved in a case that the secondary battery had higher energy density.

3. Influence of a Particle Size of a First Material or a Second Material on Performance of a Secondary Battery Examples 13 to 20

Different from Example 4, related parameters in the steps of preparing the positive electrode plate were adjusted to obtain corresponding secondary batteries. Herein, in Example 16, a mass ratio of single particles in the first material was approximately 20%; and in Example 17, a mass ratio of single particles in the first material was approximately 10%. The preparation parameters and test results different from those in Example 4 are detailed in Table 3.

TABLE 3

| Number | Positive electrode plate $D_v50$ of first material (μm) | $D_v50$ of first material (μm) | $d_c$(g/cm³) | $\varepsilon_c$ | θ | CL | E | Energy density (Wh/kg) | Cycling performance |
|---|---|---|---|---|---|---|---|---|---|
| Example 4 | 4.1 | 6.9 | 3.22 | 24% | 39° | 0.78 | 45.4 | 244 | 96% |
| Example 13 | 2.0 | 6.9 | 2.91 | 33% | 32° | 1.30 | 41.1 | 240 | 95% |
| Example 14 | 3.5 | 6.9 | 3.38 | 23% | 41° | 0.71 | 47.7 | 245 | 96% |
| Example 15 | 5.9 | 6.9 | 3.43 | 22% | 42° | 0.66 | 48.4 | 246 | 96% |
| Example 16 | 15.0 | 6.9 | 3.62 | 20% | 43° | 0.59 | 51.1 | 247 | 95% |
| Example 17 | 20.0 | 6.9 | 3.85 | 17% | 45° | 0.48 | 54.3 | 248 | 94% |
| Example 18 | 4.1 | 5.5 | 3.12 | 26% | 39° | 0.84 | 44.0 | 243 | 96% |
| Example 19 | 4.1 | 4.1 | 3.05 | 29% | 39° | 0.94 | 43.0 | 242 | 95% |
| Example 20 | 4.1 | 8.5 | 3.35 | 22% | 39° | 0.71 | 47.3 | 245 | 96% |

It can be seen from Table 3 that the particle size of the first material or the second material was adjusted, so that the energy density or the cycling performance of the secondary battery could be further improved.

4. Influence of a Ratio of a First Material to a Second Material on Performance of a Secondary Battery Examples 21 to 24

Different from Example 4, related parameters in the steps of preparing the positive electrode plate were adjusted to obtain corresponding secondary batteries. The preparation parameters and test results different from those in Example 4 are detailed in Table 4.

TABLE 4

| Number | Positive electrode plate | | | | | | |
|---|---|---|---|---|---|---|---|
| | Mass ratio of first material to second material | $d_c(g/cm^3)$ | $\varepsilon_c$ | θ | CL | E | Energy density (Wh/kg) | Cycling performance |
| Example 4 | 9:1 | 3.22 | 24% | 39° | 0.78 | 45.4 | 244 | 96% |
| Example 21 | 95:5 | 3.28 | 23% | 42° | 0.69 | 46.3 | 244 | 97% |
| Example 22 | 97:3 | 3.31 | 22% | 45° | 0.62 | 46.7 | 245 | 97% |
| Example 23 | 8:2 | 3.01 | 30% | 25° | 1.51 | 42.5 | 242 | 94% |
| Example 24 | 7:3 | 2.98 | 33% | 23° | 1.81 | 42.1 | 241 | 93% |

It can be seen from Table 4 that the ratio of the first material to the second material was within a proper range, so that the energy density and the cycling performance of the secondary battery could be further improved.

5. Influence of Morphology of a First Material or a Second Material on Performance of a Secondary Battery Examples 25 to 29

Different from Example 4, related parameters in the steps of preparing the positive electrode plate were adjusted to obtain corresponding secondary batteries. The preparation parameters different from those in Example 4, are detailed in Table 5-1. The test results are given in Table 5-2.

TABLE 5-1

| Number | Preparation parameters of positive electrode plate | | | | | | | | |
|---|---|---|---|---|---|---|---|---|---|
| | $D_v50$ of first material μm | Number percentage of single particles in first | $D_v50$ of first material (μm) | Particle morphology of second material | Mass ratio of first material to second material | Viscosity of positive electrode slurry (mPa·s) | $l_c$ | $d_c(g/cm^3)$ | $\varepsilon_c$ |
| Example 4 | 4.1 | 90% | 6.9 | Secondary particle | 9:1 | 6200 | 0.97 | 3.22 | 24% |
| Example 25 | 4.1 | 90% | 1.1 | Single particle | 9:1 | 8500 | 0.97 | 3.18 | 25% |
| Example 26 | 4.1 | 90% | 1.1 | Single particle | 8:2 | 9000 | 0.91 | 3.01 | 27% |
| Example 27 | 6 | 80% | 1.1 | Single particle | 8:2 | 8900 | 0.91 | 3.03 | 27% |
| Example 28 | 10 | 80% | 6.9 | Secondary particle | 8:2 | 7100 | 0.93 | 3.12 | 26% |
| Example 29 | 13 | 0% | 6.9 | Secondary particle | 8:2 | 6700 | 0.93 | 3.14 | 26% |

TABLE 5-2

| Number | Test results | | | | |
|---|---|---|---|---|---|
| | θ | CL | E | Energy density (Wh/kg) | Cycling performance |
| Example 4 | 39° | 0.78 | 45.4 | 244 | 96% |
| Example 25 | 38° | 0.83 | 44.9 | 243 | 95% |
| Example 26 | 35° | 0.97 | 39.9 | 242 | 96% |
| Example 27 | 35° | 0.97 | 40.1 | 242 | 96% |
| Example 28 | 37° | 0.89 | 42.2 | 243 | 95% |
| Example 29 | 37° | 0.89 | 42.5 | 243 | 94% |

It can be seen from Table 5-1 and Table 5-2 that using the first material and the second material with proper morphology could further improve the energy density and the cycling performance of the secondary battery.

6. Influence of a Type of a First Material on Performance of a Secondary Battery Examples 30 to 33

Different from Example 4, related parameters in the steps of preparing the positive electrode plate were adjusted to obtain a corresponding secondary battery. The preparation parameters and test results different from those in Example 4 are detailed in Table 6.

TABLE 6

| Number | First material Type | $D_v50$ (μm) | Number percentage of single particles | $d_c$(g/cm³) | $\varepsilon_c$ | θ | CL | E | Energy density (Wh/kg) | Cycling performance |
|---|---|---|---|---|---|---|---|---|---|---|
| Example 4 | $LiNi_{0.5}Co_{0.2}Mn_{0.3}O_2$ | 4.1 | 90% | 3.22 | 24% | 39° | 0.78 | 45.4 | 244 | 96% |
| Example 30 | $LiNi_{0.57}Co_{0.08}Mn_{0.35}O_2$ | 3.5 | 90% | 3.13 | 26% | 38° | 0.86 | 44.2 | 243 | 96% |
| Example 31 | $LiNi_{0.6}Co_{0.2}Mn_{0.2}O_2$ | 3.8 | 95% | 3.17 | 25% | 37° | 0.85 | 44.7 | 243 | 95% |
| Example 32 | $LiNi_{0.65}Co_{0.07}Mn_{0.28}O_2$ | 3.6 | 85% | 3.16 | 25% | 37° | 0.85 | 44.6 | 243 | 94% |
| Example 33 | $LiNi_{0.8}Co_{0.1}Mn_{0.1}O_2$ | 12 | 30% | 3.27 | 22% | 41° | 0.68 | 46.2 | 245 | 93% |

It can be seen from Table 6 that using the proper first material could further improve the energy density or cycling performance of the secondary batteries.

The foregoing descriptions are merely specific implementations of this disclosure, but are not intended to limit the protection scope of this disclosure. Various equivalent modifications or replacements readily figured out by a person skilled in the art within the technical scope disclosed in this disclosure shall fall within the protection scope of this disclosure.

What is claimed is:

1. A secondary battery, comprising a positive electrode plate, a negative electrode plate, and an electrolyte, wherein
the positive electrode plate comprises a positive electrode current collector and a positive electrode film layer being disposed on at least one surface of the positive electrode current collector, the positive electrode film layer comprising a positive electrode active material, and
the negative electrode plate comprises a negative electrode current collector and a negative electrode film layer being disposed on at least one surface of the negative electrode current collector, the negative electrode film layer comprising a negative electrode active material; and, wherein
the positive electrode active material comprises a first material and a second material, the first material contains one or more of layered lithium transition metal oxides and their modified compounds, and the second material contains one or more of an olivine-structured lithium-containing phosphate and its modified compounds;
the secondary battery satisfies $$4 \leq \frac{d_c \times l_c \times d_a \times l_a}{I_e} \leq 90,$$

wherein
$d_c$ is compacted density of the positive electrode film layer and measured in g/cm³;
$l_c$ is a mass ratio of the positive electrode active material to the positive electrode film layer;
$d_a$ is compacted density of the negative electrode film layer and measured in g/cm³;
$l_a$ is a mass ratio of the negative electrode active material to the negative electrode film layer; and $I_e$ is a ratio of a mass of the electrolyte to a total mass of the electrolyte, the positive electrode active material, and the negative electrode active material in the secondary battery, and
the secondary battery further satisfies:

$$0.03 \leq \frac{\varepsilon_c \times \varepsilon_a \times \sigma}{\theta'} \leq 8;$$

and
wherein σ is ionic conductivity of the electrolyte at 25° C. and measured in mS/cm;
$\varepsilon_c$ is porosity of the positive electrode film layer;
$\varepsilon_a$ is porosity of the negative electrode film layer; and
θ' is an electrolyte contact angle of the positive electrode film layer and measured in radian.

2. The secondary battery according to claim 1, wherein the secondary battery satisfies:

$$10 \leq \frac{d_c \times l_c \times d_a \times l_a}{I_e} \leq 55.$$

3. The secondary battery according to claim 1, wherein the secondary battery further satisfies one or more of the following (1) to (5):
(1) the compacted density $d_c$ of the positive electrode film layer is 2.1 g/cm³ to 4.2 g/cm³;
(2) the mass ratio $l_c$ of the positive electrode active material to the positive electrode film layer is 0.85 to 0.99;
(3) the compacted density $d_a$ of the negative electrode film layer is 1.0 g/cm³ to 2.2 g/cm³;
(4) the mass ratio $l_a$ of the negative electrode active material to the negative electrode film layer is 0.85 to 0.99; and
(5) the ratio $I_e$ of the mass of the electrolyte to the total mass of the electrolyte, the positive electrode active material, and the negative electrode active material in the secondary battery is 0.1 to 0.5, and optionally 0.1 to 0.3.

4. The secondary battery according to claim 1, wherein the secondary battery further satisfies one or more of the following (1) to (4):
(1) porosity $\varepsilon_c$ of the positive electrode film layer is 10% to 50%;
(2) the porosity $\varepsilon_a$ of the negative electrode film layer is 10% to 50%;

(3) ionic conductivity a of the electrolyte at 25° C. is 0.5 mS/cm to 50 mS/cm; and
(4) electrolyte contact angle θ of the positive electrode film layer satisfies 0°≤θ≤75°.

5. The secondary battery according to claim 1, wherein a median particle size by volume $D_v50$ of the first material is 0.1 μm to 30 μm; or
a median particle size by volume $D_v50$ of the second material is 0.01 μm to 15 μm.

6. The secondary battery according to claim 1, wherein the first material comprises one or more of single particles and secondary particles.

7. The secondary battery according to claim 1, wherein the second material comprises secondary particles.

8. The secondary battery according to claim 1, wherein a mass ratio of the first material to the second material is 99.9:0.1 to 50:50.

9. The secondary battery according to claim 1, wherein the first material is selected from one or more of a lithium nickel cobalt manganese oxide, a lithium nickel cobalt aluminum oxide, a lithium cobalt oxide, and their respective modified compound; or the second material is selected from one or more of lithium iron phosphate, lithium manganese phosphate, lithium manganese iron phosphate, lithium vanadium iron phosphate, and their respective modified compounds.

10. The secondary battery according to claim 1, wherein the negative electrode active material contains one or more of artificial graphite, natural graphite, silicon-based material, and tin-based material.

11. A battery module, comprising the secondary battery according to claim 1.

12. A battery pack, comprising the secondary battery according to claim 1.

13. A preparation method of a secondary battery, comprising:
preparing a positive electrode slurry by using a positive electrode active material, wherein the positive electrode active material comprises a first material and a second material, the first material contains one or more of layered lithium transition metal oxides and their modified compounds, and the second material contains one or more of an olivine-structured lithium-containing phosphate and its modified compounds;
applying the positive electrode slurry on at least one surface of a positive electrode current collector to form a positive electrode film layer, to obtain a positive electrode plate; and
assembling the positive electrode plate, a negative electrode plate, and an electrolyte into the secondary battery, wherein the negative electrode plate comprises a negative electrode current collector and a negative electrode film layer that is disposed on at least one surface of the negative electrode current collector and that comprises a negative electrode active material;
wherein the secondary battery satisfies $$4 \le \frac{d_c \times l_c \times d_a \times l_a}{I_e} \le 90,$$

wherein
$d_c$ is compacted density of the positive electrode film layer and measured in g/cm³;
$l_c$ is a mass ratio of the positive electrode active material to the positive electrode film layer;
$d_a$ is compacted density of the negative electrode film layer and measured in g/cm³;
$l_a$ is a mass ratio of the negative electrode active material to the negative electrode film layer; and
$I_e$ is a ratio of a mass of the electrolyte to a total mass of the electrolyte, the positive electrode active material, and the negative electrode active material in the secondary battery; and
wherein the secondary battery further satisfies:

$$0.03 \le \frac{\varepsilon_c \times \varepsilon_a \times \sigma}{\theta'} \le 8;$$

and
wherein σ is ionic conductivity of the electrolyte at 25° C. and measured in mS/cm;
$\varepsilon_c$ is porosity of the positive electrode film layer;
$\varepsilon_a$ is porosity of the negative electrode film layer; and
θ' is an electrolyte contact angle of the positive electrode film layer and measured in radian.

14. The preparation method according to claim 13, wherein viscosity of the positive electrode slurry is 4000 mPa·s to 15000 mPa·s; or
a solid content in the positive electrode slurry is 60% to 80%.

* * * * *